Patented Jan. 26, 1954

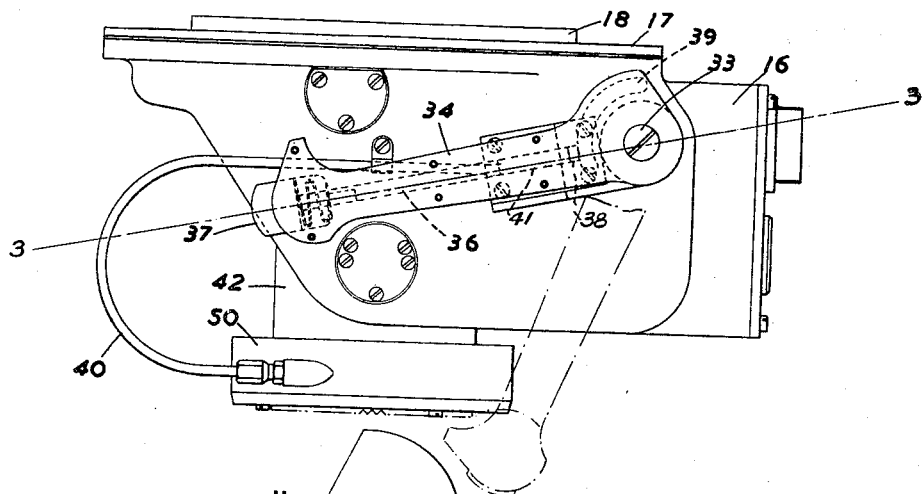
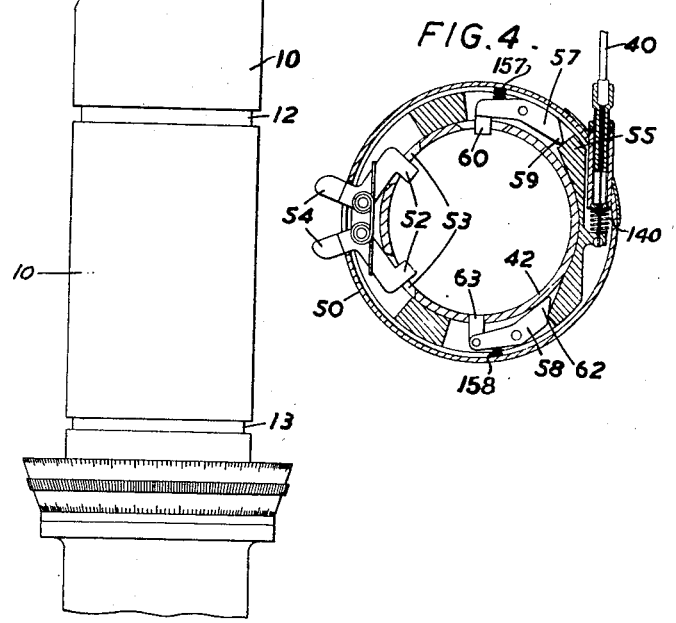

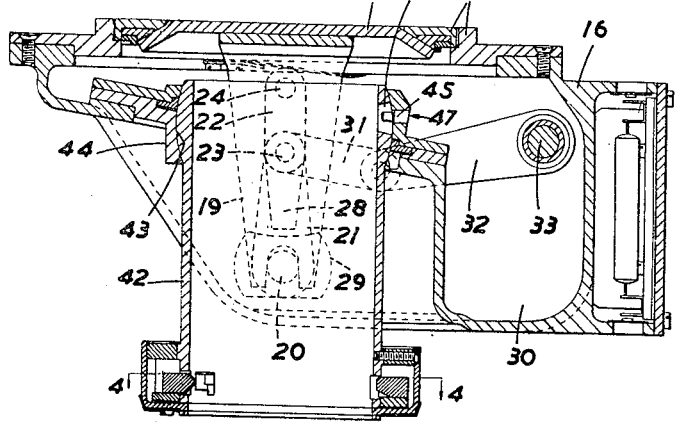
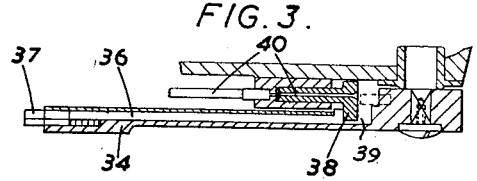
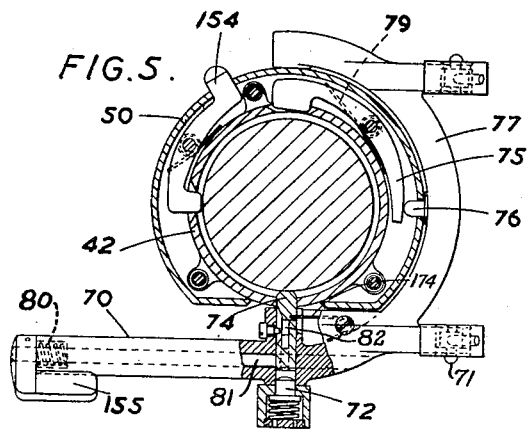

2,666,990

UNITED STATES PATENT OFFICE 2,666,990

PERISCOPIC SEXTANT AND OTHER INSTRUMENTS

Philip Francis Everitt and George Robert Jamieson, Seven Kings, England, assignors, by mesne assignments, to Kelvin & Hughes Limited, a British company Application October 4, 1949, Serial No. 119,494

Claims priority, application Great Britain October 5, 1948

8 Claims. (Cl. 33—46)

1

This invention relates to periscopic sextants for pressurized aircraft and other instruments (for example submarine sextants or periscopes and aircraft drift sights) and its main object is to enable the upper end of the instrument to be pushed out beyond the skin of the aircraft or other vehicle without appreciable inlet or loss of air or water or pressure.

According to the invention a hatch device is mounted on the vehicle and has a tube or other guideway which closely receives the periscope tube or the like tubular part of the instrument, a hatch cover which is normally closed, means for locking the hatch in closed position, means whereby the tubular part can be inserted in the guideway only to an intermediate position when the cover is locked, in which position however the tubular part holds the locking means in unlocked position whereupon the cover can be opened, and the instrument can then be pushed up to its operative position. Preferably also means are provided for locking the periscope tube or the like against downwards removal whilst the hatch cover is open. The locking control is preferably effected by means of pawls that enter a groove in the outer surface of the periscope tube.

A constructional form of the invention will now be described by way of example with reference to the accompanying diagrammatic drawings wherein:

Figure 1 is a side elevational view of a hatch and associated periscopic tube (of a sextant) made in accordance with the invention;

Figure 2 is a vertical sectional view of the hatch;

Figure 3 is a part sectional view on the line 3—3 on Figure 1;

Figure 4 is a sectional view on the lines 4—4 on Figure 2; and

Figure 5 is a view similar to Figure 4 but showing a modified construction.

The outer periscope tube or sheath 10 has a sighting window 11 at its upper end which is to extend above the skin of the aircraft. Just below this window is an annular recess or groove 12 which has rectangular upper and lower edges. At a lower level the tube has another groove 13 of slightly less dimension axially.

The hatch comprises a housing 16 having a ring 17 forming an opening through which the periscopic tube can project and which opening can be closed by a hatch cover 18. This cover is carried by a pair of arms 19 the lower ends of which are bifurcated to receive a pivot pin 20 mounted in the housing 16. The arms 19 can

2 move vertically in relation to the pin 20. This pin carries a lever 21 forming part of a toggle the other lever of which is shown at 22. The levers 21, 22, are pivoted together at 23 and the upper end of lever 22 is pivotally attached at 24 to the two arms 19. The lever 22 is extended to form a projection 28 adapted to ride over a cam 29 which is carried in fixed condition by pin 20 and whereby the toggle is broken during most of the hatch closing movement. After this projection rides past the cam 29, the toggle can be straightened thereby locking the hatch cover in closed position as shown. The pin 23 is connected by a pair of links 31 to a yoke 32 which is mounted on a spindle 33 rotation of which in the anti-clockwise direction breaks the toggle and opens the hatch which moves into a space 30. This toggle and cam device are more fully described in the specification of Patent No. 2,578,234, issued December 11, 1951. The spindle 33 carries an operating lever 34 which has a groove 41 that contains a sliding rod 36 one end of which protrudes to form a press-button 37. The inner end of the rod moves a small block 38 (Figure 3) radially of the lever pivot 33 into a concentric slot 39 in the hatch housing whereby the handle can be then moved to open the hatch cover. The block is connected to the inner member of a Bowden cable 40 the purpose of which will be described hereinafter. Normally the block 38 when not in the slot 39 is disposed in the end of the groove 41 in the lever 34.

A hatch tube 42 serves as a guide to receive and locate the periscopic tube of a periscopic sextant. The tube 42 has its upper end formed with a frusto-spherical part 43 which seats in a similarly shaped bearing ring 44 carried by the hatch housing, whereby the tube and sextant can be tilted to a suitable extent. A pin 45 carried by a ring 47 enters a vertical slot 46 in the tube to prevent rotation of the tube.

The hatch tube carries a casing 50 which surrounds the lower end of the tube and contains pawls and other elements particularly seen in Figure 4. The casing 50 contains a pair of pawls 54 the inner ends 52 of which project through openings 53 in the tube and can engage in either of the grooves 12, 13, in the periscopic tube. The other end of the Bowden cable 40 is connected to the middle of a double abutment block 55 slidable around the casing 50 and having two wings engageable by two pivoted pawls 57, 58 respectively. The two pawls as shown are pivoted on axes parallel to the tube or guideway 42 and their tails are directed towards each other to contact the block 55. The pawl 57 is urged by a spring 157 whereby it normally has one end 59 engaging the block 55 to prevent it from moving and in this position the other end 60 of the pawl 57 enters through an aperture in the hatch tube. This end is rounded or chamfered on both upper and lower sides so that it can be pushed back by the periscopic tube when this is inserted into the hatch tube. When the periscopic tube is entered into the hatch tube far enough, the inner nose 60 enters the groove 12 the depth of which is such as to position the pawl 57 so that its end 59 is clear of the block 55 which can then be moved by the Bowden cable upon operation of the press button 37 to permit opening of the hatch cover. The nose 60 is actually repressed by the first entry of the full diameter of the periscope tube before the groove 12 reaches the nose 60 but in practice the operator pushes the periscope tube up into the hatch tube until the nose 60 snaps into the groove 12. The pawl 58 is urged by the spring 158 whereby it has one end 62 engaged by the other wing of the block 55 which holds the nose 63 on the other end of the pawl out of the annular groove 12 but when the block is moved permits this nose to enter the groove. This nose is rounded on the under side only so that (after the hatch has been opened) it can be pushed aside to permit the periscope tube to be pushed up but not down. Thus when the periscopic tube is entered far enough to bring the groove 12 into line with the pawls the hatch cover can be opened and the periscope can then be pushed up into effective position but cannot be pulled down out of the hatch tube. The nose 63 is however too wide to enter the groove 13 which is however engaged by the other pawls 54, 57. The periscopic tube can therefore be pulled down from its operative position after retracting pawls 54 until the noses 60, 63 again enter the groove 12. When the hatch is shut, the nose 63 is retracted and the tube 10 can be removed entirely from the tube 42. When the hatch is closed the tube 10 can only be inserted in the tube 42 to an intermediate position since the pawl 60 will prevent further movement. A spring 140 acting under compression returns the parts 55, 40 to their normal (hatch closed) positions. The pawls 54 engage in the groove 12 before the other pawls engage. When the periscope tube has been moved up to its operative position the pawls 54 engage in the groove 13. The pawl 63 cannot engage in the groove 13 since the latter is too small axially for this purpose.

In the construction illustrated in Figure 5 the hatch cover operating lever 70 is mounted on a pivotal axis 71. The casing carries a spring pressed locking pin 72 which engages a hole in the lever to prevent it from moving. This hole passes through the lever and contains a control pawl or pin 74 slidable at right angles to the axis of the tube 42. The inner end of the pin 74 passes through the tube and can enter the groove 12 in the periscope tube, the latter in this construction also having the grooves 12, 13. The lever 70 carries a finger button 155 which is rotatable about the longitudinal axis of the lever. This button is attached to a rod 81 the end of which adjacent the pin 74 carries a projection (not shown) at right angles to the length of the rod. The pin 74 is formed with a slot 82. A spring 174 urges the pin 74 towards its normal inner position in which (with the instrument removed) the pin 74 will be projecting slightly more into the hatch tube 42 than is shown. In this inner position the projection on rod 81 cannot enter the slot 82. The operator will insert the periscope tube 10 into the hatch tube 42 until the pin snaps into the groove or recess 12 which is the position shown in Figure 5. In this position when the rod is rotated by operation of the button 155 the said projection enters the slot 82 in the pin 74 and moves the pin 74 until its outer end is flush with the outer surface of the lever 70. The inner end of the pin 74 is then clear of the tube 42 and the inner end of the pin 72 is clear of the lever 70. The lever 70 can then be operated to open the hatch cover. A torsion spring 80 urges the rod 81 towards its normal position in which the pin 74 is in the position shown. If the periscope tube is not correctly located the said projection will overlap the end of the slot 82 and therefore cannot enter the slot 82 and the pin 72 prevents movement of the lever. The casing carries a single spring pressed finger-operable pawl 154 one end of which passes through an opening in the tube and enters the groove in the tube 10. The casing also carries a cam operated pawl 75 which is urged by a spring 79 to engage the groove 12 when the lever 70 is moved to the hatch cover opening position. This pawl is cam shaped below but not at its upper part so that it can be pushed aside to enable the periscope tube to be pushed up to the operative position but by entering groove 12 prevents its being pulled out whilst the hatch cover is open. The pawl is however retracted by means of a cam-button 76 on the lever 70 when the latter is moved to the hatch-closed position. The lever 70 has a semi-circular shape at 77 with an extension on one end, the semi-circular part surrounding the periscope tube when the hatch is closed to prevent tilting movements. The pawls 74, 75 are in principle the same as pawls 57, 58 respectively of Figure 4. Thus the pawl 75 is too big to enter the groove 13 and the pin 74 will not enter the groove 13 as it will be retracted.

We claim:

1. A hatch control device for use with a periscope sextant or other instrument of the kind having a hatch guideway which closely receives a tubular part of the instrument and a hatch cover on said guideway which is normally closed, comprising cover moving means for moving the hatch cover to open and closed positions, holding means for holding said cover moving means against movement to the cover opening position, and movable means for locking and unlocking the holding means, said movable means projecting into the hatch guideway, and being actuated by the tubular part to the holding means unlocking position whereupon the cover can be opened, and the instrument can then be pushed along the guideway to its operative position.

2. A hatch device as claimed in claim 1 wherein means are provided for projecting into the path of a part of the tubular part while the hatch cover is open thereby locking the tubular part against downwards removal.

3. A hatch device as claimed in claim 1 wherein the movable means comprises a pawl a part of which projects into the path of the tubular part and is moved thereby into a position in which the pawl permits opening of the hatch cover.

4. A hatch control device for use with a periscope sextant or other instrument of the kind having a hatch guideway which closely receives a tubular part of the instrument and a hatch cover on said guideway which is normally closed, said tubular part being provided with a recess therein, and comprising cover moving means for moving the hatch cover to open and closed positions, holding means for holding said cover moving means against movement to the cover opening position, and movable means for locking and unlocking the holding means, said movable means projecting into the hatch guideway, and being actuated by the tubular part to the holding means unlocking position whereupon the cover can be opened, and the instrument can then be pushed along the guideway to its operative position, and wherein two pawls are provided one of which constitutes said movable means, and said holding means comprises a movable device which moves with said cover moving means and co-operates with the pawls so that when the pawl constituting said movable means is repressed by the tubular part the cover moving means and the movable device can be moved to the cover opening position, and means are provided for moving the other pawl when the movable device moves to its cover opening position to engage said other pawl in said recess in the tubular part to prevent its withdrawal.

5. A hatch control device for use with a periscope sextant or other instrument of the kind having a hatch guideway which closely receives a tubular part of the instrument and a hatch cover on said guideway which is normally closed, said tubular part having at least one annular recess therein, and comprising cover moving means for moving the hatch cover to open and closed positions, holding means for holding said cover moving means against movement to the cover opening position, and movable means for locking and unlocking the holding means, said movable means having a part thereof projecting into the hatch guideway, and being actuated by the tubular part to the holding means unlocking position whereupon the cover can be opened, and the instrument can then be pushed along the guideway to its operative position, a pawl which engages said recess in the tubular part to prevent withdrawal of the tubular part from the hatch guideway, said pawl being of such shape on one side as to permit insertion of the tubular part into the guideway, said part of said movable means being so shaped on both sides as to permit repression of this part by the movement of the tubular part into and out of the guideway.

6. A hatch control device for use with a periscope sextant or other instrument of the kind having a hatch guideway which closely receives a tubular part of the instrument and a hatch cover on said guideway which is normally closed, said tubular part having first and second recesses spaced axially along it, and comprising cover moving means for moving the hatch cover to open and closed positions, holding means for holding said cover moving means against movement to the cover opening position, and movable means for locking and unlocking the holding means, said movable means projecting into the hatch guideway, and being actuated by the tubular part to the holding means unlocking position whereupon the cover can be opened, and the instrument can then be pushed along the guideway to its operative position, and wherein first and second pawls are provided, said first pawl constituting part of said movable means, and said holding means comprises a movable device which moves with said cover moving means and co-operates with said pawls so that when said first pawl is repressed by the tubular part the cover moving means and the movable device can be moved to the cover opening position, and means are provided for moving said second pawl when the movable device moves the cover opening position to engage said second pawl in said first recess in the tubular part to prevent its withdrawal, and wherein said second pawl is larger than said first pawl so that said second pawl will not enter said second recess in the tubular part which however can be entered by the said first pawl in the operative position of the instrument.

7. A hatch control device as claimed in claim 4 wherein the two pawls are pivoted on axes parallel with the guideway and have tails directed towards each other contacting opposite ends of the said holding means.

8. A hatch control device for a periscope sextant or other instrument of the kind having a hatch guideway which closely receives a tubular part of the instrument and a hatch cover on said guideway which is normally closed, and comprising cover moving means for moving the hatch cover to open and closed positions, a part fixed relatively to said guideway, a member movable by the operator, a hatch locking pawl which in one position engages the fixed part and said moving means to prevent movement of said moving means, a spring urging said pawl to said position, a pin coaxial with said pawl, said pin having one end projecting into said guideway and locatable in a normal position and locatable by said tubular part in a partly repressed position, means whereby the operator can move said pin to a fully repressed position only after it has been moved by said tubular part to its partly repressed position, said pin in its fully repressed position having its outer end flush with the adjacent surfaces of the fixed part and said moving means so as to hold the pawl repressed and permit movement of said moving means for opening the hatch cover.

PHILIP FRANCIS EVERITT.
GEORGE ROBERT JAMIESON.

References Cited in the file of this patent

UNITED STATES PATENTS

| Number | Name | Date |
|---|---|---|
| 1,275,975 | Murdock | Aug. 13, 1918 |
| 1,313,534 | Hoffman | Aug. 19, 1919 |
| 2,554,010 | Carbonara | May 22, 1951 |

FOREIGN PATENTS

| Number | Country | Date |
|---|---|---|
| 2,613 | Great Britain | 1876 |